(12) United States Patent
Meng et al.

(10) Patent No.: US 11,586,930 B2
(45) Date of Patent: Feb. 21, 2023

(54) CONDITIONAL TEACHER-STUDENT LEARNING FOR MODEL TRAINING

(71) Applicant: Microsoft Technology Licensing, LLC, Redmond, WA (US)

(72) Inventors: Zhong Meng, Seattle, WA (US); Jinyu Li, Redmond, WA (US); Yong Zhao, Redmond, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 866 days.

(21) Appl. No.: 16/410,741

(22) Filed: May 13, 2019

(65) Prior Publication Data

US 2020/0334538 A1 Oct. 22, 2020

Related U.S. Application Data

(60) Provisional application No. 62/834,601, filed on Apr. 16, 2019.

(51) Int. Cl.
*G06N 3/08* (2006.01)
*G10L 15/183* (2013.01)
(Continued)

(52) U.S. Cl.
CPC .......... *G06N 3/084* (2013.01); *G06N 3/0454* (2013.01); *G10L 15/16* (2013.01); *G10L 15/183* (2013.01)

(58) Field of Classification Search
CPC ...... G06N 3/084; G06N 3/0454; G10L 15/16; G10L 15/183
See application file for complete search history.

(56) References Cited

U.S. PATENT DOCUMENTS

2016/0078339 A1* 3/2016 Li .................. G06N 3/084
706/20
2019/0051290 A1* 2/2019 Li .................. G10L 15/183
(Continued)

FOREIGN PATENT DOCUMENTS

WO 2018062265 A1 4/2018

OTHER PUBLICATIONS

Liao, "Speaker adaptation of context dependent deep neural networks," 2013 IEEE International Conference on Acoustics, Speech and Signal Processing, 2013, pp. 7947-7951, doi: 10.1109/ICASSP. 2013.6639212 (Year: 2013).*

(Continued)

*Primary Examiner* — Michelle M Koeth
(74) *Attorney, Agent, or Firm* — Workman Nydegger

(57) ABSTRACT

Embodiments are associated with conditional teacher-student model training. A trained teacher model configured to perform a task may be accessed and an untrained student model may be created. A model training platform may provide training data labeled with ground truths to the teacher model to produce teacher posteriors representing the training data. When it is determined that a teacher posterior matches the associated ground truth label, the platform may conditionally use the teacher posterior to train the student model. When it is determined that a teacher posterior does not match the associated ground truth label, the platform may conditionally use the ground truth label to train the student model. The models might be associated with, for example, automatic speech recognition (e.g., in connection with domain adaptation and/or speaker adaptation).

22 Claims, 11 Drawing Sheets

(51) Int. Cl.
G06N 3/04 (2006.01)
G10L 15/16 (2006.01)
G06N 3/084 (2023.01)

(56) References Cited

U.S. PATENT DOCUMENTS

2019/0205748 A1* 7/2019 Fukuda .................... G06N 3/08
2020/0034702 A1* 1/2020 Fukuda ................ G06N 3/0454
2020/0035223 A1 1/2020 Asami et al.

OTHER PUBLICATIONS

Li et al., "Large-Scale Domain Adaptation via Teacher-Student Learning," Aug. 17, 2017, arXiv:1708.05466v1 [cs.CL] https://doi.org/10.48550/arXiv.1708.05466 (Year: 2017).*
Li et al., "Certainty-Driven Consistency Loss for Semi-supervised Learning," arXiv:1901.05657v1, Jan. 17, 2019 [cs.CV], https://doi.org/10.48550/arXiv.1901.05657 (Year: 2 019).*
Asami, et al., "Domain adaptation of DNN acoustic models using knowledge distillation", In Proceedings of IEEE International Conference on Acoustics, Speech and Signal Processing, Mar. 5, 2017, pp. 5185-5189.
Chen, et al., "A Teacher-Student Framework for Zero-Resource Neural Machine Translation", In Proceedings of the 55th Annual Meeting of the Association for Computational Linguistics, vol. 1, Long Papers, Jul. 30, 2017, pp. 1925-1935.
Cui, et al., "Knowledge Distillation Across Ensembles of Multilingual Models for Low Resource Languages", In Proceeding of the IEEE International Conference on Acoustics, Speech and Signal Processing, Mar. 5, 2017, pp. 4825-4829.
Deng, et al., "Recent Advances in Deep Learning for Speech Research at Microsoft", In Proceedings of the IEEE International Conference on Acoustics, Speech and Signal Processing, May 26, 2013, pp. 8604 8608.
Hinton, et al., "Deep Neural Networks for Acoustic Modeling in Speech Recognition: The Shared Views of Four Research Groups", In Proceedings of the IEEE Signal Processing Magazine, vol. 29, Issue 6, Nov. 1, 2012, pp. 82-97.
Hinton, et al., "Distilling the Knowledge in a Neural Network", In Journal of Computing Research Repository, Mar. 2015, 9 Pages.
Huang, et al., "Rapid Adaptation for Deep Neural Networks through Multi-Task Learning", In Proceedings of the Sixteenth Annual Conference of the International Speech Communication Association, Sep. 6, 2015, pp. 3625-3629.
Jaitly, et al., "Application of Pielrained Deep Neural Networks to Large Vocabulary Speech Recognition", In Proceedings of 13th Annual Conference of the International Speech Communication Association, Sep. 9, 2012, pp. 2578-2581.
Kim, et al., "Sequence-Level Knowledge Distillation", In Proceedings of the Conference on Empirical Methods in Natural Language Processing, Nov. 2016, pp. 1317-1327.
Li, et al., "An Overview of Noise-Robust Automatic Speech Recognition", In Journal of IEEE Transactions on Audio, Speech, and Language Processing, vol. 22, Issue 4, Apr. 2014, pp. 745-777.
Li, et al., "Developing Far-Field Speaker System via Teacher-Student Learning", In IEEE International Conference on Acoustics, Speech and Signal Processing, Apr. 15, 2018, pp. 5699-5703.
Seide, et al., "Feature engineering in context-dependent deep neural networks for conversational speech transcription", In Proceedings of IEEE the Workshop on Automatic Speech Recognition Understanding, Dec. 11, 2011, pp. 24-29.
Li, et al., "Improving Wide-band Speech Recognition Using Mixed-Bandwidth Training Data in CD-DNN-HMM", In the Proceedings of IEEE Spoken Language Technology Workshop, Dec. 2, 2012, pp. 131-136.
Li, et al., "Large-Scale Domain Adaptation via Teacher-Student Learning", In Journal of the Computing Research Repository, Aug. 20, 2017, 5 Pages.
Li, et al., "Learning Small-Size DNN with Output-Distribution-Based Criteria", In Proceeding of 15th Annual Conference of the International Speech Communication Association, Sep. 14-18, 2014, pp. 1910-1914.
Liao, Hank, "Speaker Adaptation of Context Dependent Deep Neural Networks", In Proceedings of the IEEE International Conference on Acoustics, Speech and Signal Processing, May 26, 2013, pp. 7947-7951.
Marxer, et al., "The Third Chime Speech Separation and Recognition Challenge: Dataset, Task and Baselines", In Proceedings of IEEE the Workshop on Automatic Speech Recognition and Understanding, Dec. 13, 2015, 9 Pages.
Meng, et al., "Adversarial Teacher-student Learning for Unsupervised Domain Adaptation", In Proceedings of IEEE International Conference on Acoustics, Speech and Signal Processing, Apr. 2, 2018, 5 Pages.
Sainath, et al., "Making Deep Belief Networks Effective for Large Vocabulary Continuous Speech Recognition", In Proceeding of IEEE the Workshop on Automatic Speech Recognition and Understanding, Dec. 11, 2011, pp. 30-35.
Sak, et al., "Long Short-term Memory Recurrent Neural Network Architectures for Large Scale Acoustic Modeling", In Proceedings of the Fifteenth Annual Conference of the International Speech Communication Association, Sep. 14, 2014, pp. 338-342.
Samarakoon, et al., "Factorized Hidden Layer Adaptation for Deep Neural Network based Acoustic Modeling", In Proceedings of the IEEE/ACM Transactions on Audio, Speech, and Language Processing, vol. 24, Issue 12, Dec. 2016, pp. 2241-2250.
Saon, et al., "Speaker Adaptation of Neural Network Acoustic Models Using I-Vectors", In Proceedings of the IEEE Workshop on Automatic Speech Recognition and Understanding, Dec. 8, 2013, pp. 55-59.
Swietojanski, et al., "Learning Hidden Unit Contributions for Unsupervised Acoustic Model Adaptation", In Proceedings of the IEEE/ACM Transactions on Audio, Speech, and Language Processing, vol. 24, Issue 8, Aug. 2016, pp. 1450-1463.
Tang, et al., "Recurrent Neural Network Training with Dark Knowledge Transfer", In Proceeding of IEEE the International Conference on Acoustics, Speech and Signal Processing, Mar. 20, 2016, pp. 5900-5904.
Watanabe, et al., "Student-Teacher Network Learning with Enhanced Features", In Proceeding of the IEEE International Conference on Acoustics, Speech and Signal Processing, Mar. 2017, pp. 5275-5279.
Xue, et al., "Fast Adaptation of Deep Neural Network based on Discriminant Codes for Speech Recognition", In Proceedings of the IEEE/ACM Transactions on Audio, Speech, and Language Processing, vol. 22, Issue 12, Dec. 2014, pp. 1713-1725.
Xue, et al., "Restructuring of Deep Neural Network Acoustic Models with Singular Value Decomposition", In Proceedings of the 14th Annual Conference of the International Speech Communication Association, Aug. 25, 2013, pp. 2365-2369.
Yu, et al., "KL-Divergence Regularized Deep Neural Network Adaptation for Improved Large Vocabulary Speech Recognition", In Proceedings of the IEEE International Conference on Acoustics, Speech and Signal Processing, May 26, 2013, pp. 7893-7897.
Zhao, et al., "Low-Rank Plus Diagonal Adaptation for Deep Neural Networks", In Proceedings of the IEEE International Conference on Acoustics, Speech and Signal Processing, Mar. 20, 2016, pp. 5005-5009.
Meng, et al., "Conditional Teacher-Student Learning", In Proceedings of the IEEE International Conference on Acoustics, Speech and Signal Processing, Apr. 2019, 5 Pages.
Barker, et al. "The Third 'Chime' Speech Separation and Recognition Challenge: Dataset, Task and Baselines", IEEE, 2015, 8 Pages.
"International Search Report and Written Opinion Issued in PCT Application No. PCT/US20/020716", dated Jun. 8, 2020, 13 Pages., 13 pp.

* cited by examiner

CONDITIONAL TEACHER-STUDENT LEARNING FOR MODEL TRAINING

CROSS-REFERENCE TO RELATED APPLICATIONS

The present application claims the benefit of U.S. Provisional Patent Application No. 62/834,601 entitled "CONDITIONAL TEACHER-STUDENT LEARNING" and filed Apr. 16, 2019. The entire content of that application is incorporated herein by reference.

BACKGROUND

Systems that use machine learning to perform tasks often require large datasets of well-maintained and annotated data to train the models used by those systems to accurately identify spoken words, images, text, etc. Gathering such large datasets is often time consuming, and maintaining such datasets requires large expenditures of computer storage space. Individual systems are frequently trained for a single domain (such as a given user's voice, a given compression codec, a given microphone setup, etc.), and new models need to be trained for each domain to accurately perform the task within that domain, requiring the gathering and storage of ever more and ever larger datasets to accurately create models.

It is known that Teacher-Student ("T/S") learning can help create models of smaller sizes on in a new domain. Such T/S learning has been shown to be effective for a variety of problems, such as domain adaptation, speaker adaptation, and model compression. One shortcoming of T/S learning, however, is that a teacher model is not perfect and may sporadically produce incorrect guidance (in the form of posterior probabilities) that may mislead a student model and result in suboptimal performance. What is needed is a system to accurately and efficiently improve T/S model learning.

SUMMARY

This summary is provided to introduce a selection of concepts in a simplified form that are further described below in the detailed description section. This summary is not intended to identify all key or essential features of the claimed subject matter, nor is it intended as an aid in determining the scope of the claimed subject matter.

Systems, methods, and computer readable storage devices embodying instructions for providing improved T/S model learning are provided herein. In some embodiments, a trained teacher model configured to perform a task may be accessed and an untrained student model may be created. A model training platform may provide training data labeled with ground truths to the teacher model to produce teacher posteriors representing the training data. When it is determined that a teacher posterior matches the associated ground truth label, the platform may conditionally (and automatically) use the teacher posterior to train the student model. When it is determined that a teacher posterior does not match the associated ground truth label, the platform may conditionally (and automatically) use the ground truth label to train the student model. The models might be associated with, for example, automatic speech recognition (e.g., in connection with domain adaptation and/or speaker adaptation) as well as other tasks.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

DETAILED DESCRIPTION

The following description is provided to enable any person in the art to make and use the described embodiments. Various modifications, however, will remain readily apparent to those of ordinary skill in the art.

Figure 1A:
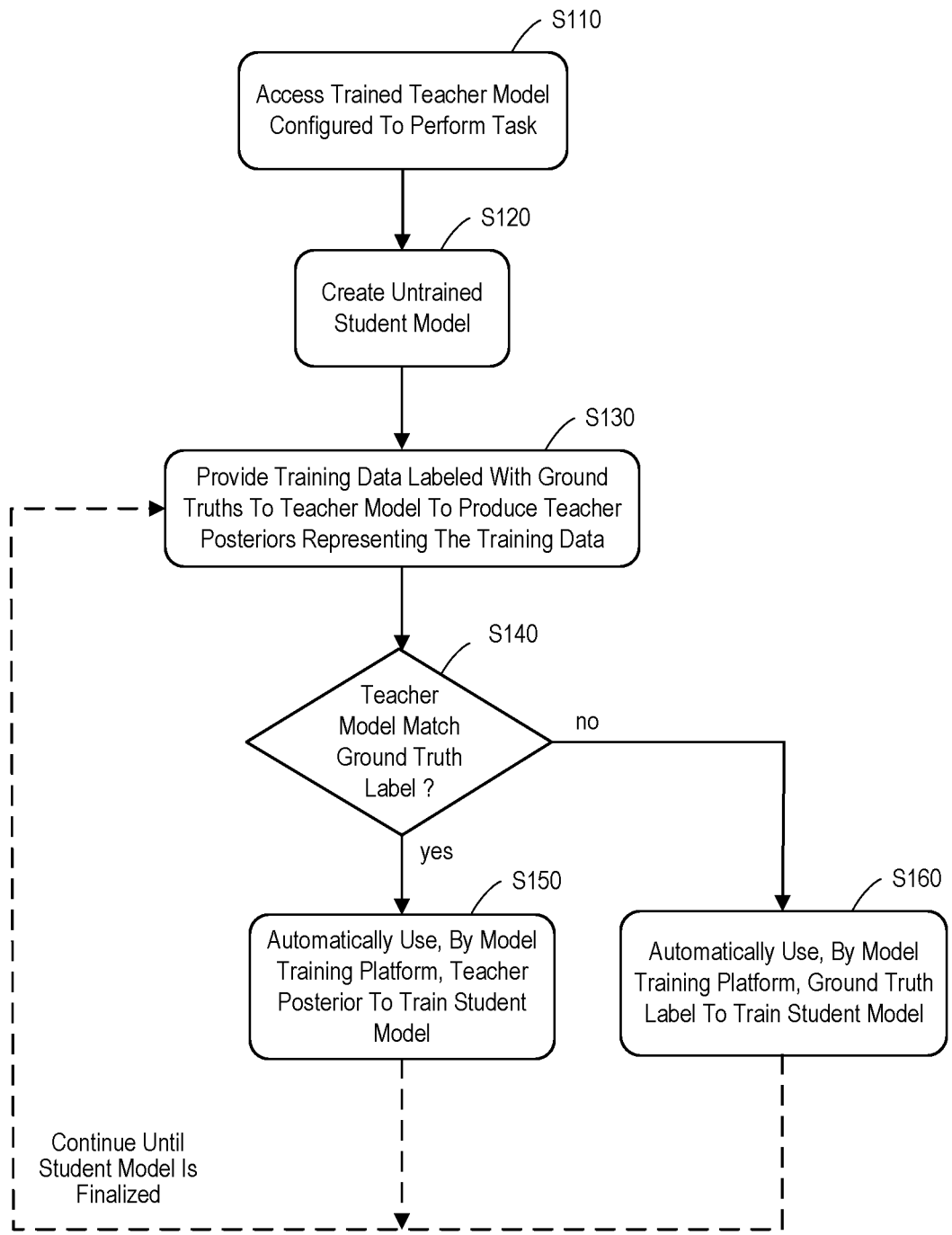
FIG. 1A is conditional T/S learning method according to some embodiments.

A teacher model may occasionally incorrectly identify frames in an utterance, which can cause the performance of a student model to degrade. To avoid such a result, a detailed process is provided in FIG. 1A which is a flow diagram of a process to use conditional T/S learning in accordance with some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S110, the model training platform accesses a trained teacher model configured to perform a task. At S120, the model training platform creates an untrained student model. At S130, training data labeled with ground truths may be provided to the teacher model to produce teacher posteriors representing the training data. When it is determined at S140 that a teacher posterior matches the associated ground truth label, the model training platform may conditionally and automatically use the teacher posterior to train the second model at S150. When it is determined that a teacher posterior does not match the associated ground truth label at S140, the model training platform may conditionally and automatically use the ground truth label to train the student model at S160. The process may repeat until the student model is finalized.

T/S learning has been widely applied to a variety of deep learning tasks in speech, language and image processing including model compression, domain adaptation, small-footprint Natural Machine Translation ("NMT"), low-resource NMT, far-field ASR, low resource language ASR neural network pre-training, etc. T/S learning falls in the category of transfer learning, where the network of interest, as a student, is trained by mimicking the behavior of a well-trained network, as a teacher, in the presence of the same or stereo training samples. Formally, the T/S learning works by minimizing the KL divergence between the output distribution of the student and teacher models, other than from the hard labels derived from the transcriptions.

Compared to using conventional one-hot hard label as the training target, the transfer of soft posteriors well preserves the probabilistic relationships among different classes encoded at the output of the teacher model. Because soft labels provide more information than hard labels for the model training, the T/S learning results in better performance. The largest benefits of using pure soft labels is learning without any hard labels, enabling the use of much larger amount of unlabeled data to improve the student model performance.

One shortcoming of T/S learning is that a teacher model, not always perfect, sporadically makes incorrect predictions that mislead the student model toward a suboptimal performance. In such a case, it may be beneficial to utilize hard labels of the training data to alleviate this effect. Some approaches use an interpolated T/S learning called knowledge distillation, in which a weighted sum of the soft posteriors and the one-hot hard label is used to train the student model. One issue is that the simple linear combination with one-hot vectors destroys the relationships among different classes embedded naturally in the soft posteriors produced by the teacher model. Moreover, proper setting of the interpolation weight with a fixed value is known to be critical and it varies with the adaptation scenarios and the qualities of the teacher and ground truth labels.

Some embodiments described herein utilize a conditional T/S learning scheme where a student model becomes smart so that it can criticize the knowledge imparted by the teacher model to make better use of the teacher and the ground truth. At the initial stage, when the student model is very weak, it may blindly follow all knowledge infused by the teacher model and use the soft posteriors as the sole training targets. As the student model grows stronger, it may begin to selectively choose the learning source from either the teacher model or the ground truth labels conditioned on whether the teacher's prediction coincides with the ground truth. That is, the student model may learn exclusively from the teacher when the teacher makes correct predictions on training samples, and otherwise from the ground truth when the teacher is wrong. With conditional T/S learning, the student makes good use of rich and correct knowledge encompassed by the teacher yet avoids receiving inaccurate knowledge generated by the teacher. Another advantage of the conditional T/S learning over the conventional T/S learning is that it forgoes tuning the interpolation weight between two knowledge sources.

In T/S learning, a well-trained teacher network takes in a sequence of training samples $X^T = \{x_1^T, \ldots, x_N^T\}$, $X_i^T \in \mathbb{R}^{D_T}$ and predicts a sequence of class labels. Here, each class is represented by an integer $c \in \{1, 2, \ldots, D_C\}$ and $D_C$ is the total number of classes in the classification task. The goal is to learn a student network that can accurately predict the class labels for each of the input samples $X^S = \{x_1^S, \ldots, x_N^S\}$, $x_i^S \in \mathbb{R}^{D_S}$ by using the knowledge transferred from the teacher network. To ensure effective knowledge transfer, the input samples $X^T$ and $X^S$ need to be parallel to each other, i.e., each pair of train samples $x_i^T$ and $x_i^S$ share the same ground truth class label $c_i \in \{1, 2, \ldots, D_C\}$.

T/S learning minimizes the KL divergence between the output distributions of the teacher network and the student network and given the parallel data $X^T$ and $X^S$ are at the input to the networks. The KL divergence between the teacher and student output distributions $p(c|x_i^T; \theta_T)$ and $p(c|x_i^S; \theta_S)$ is formulated as equation 1:

$$\mathcal{KL}[p(c|x_i^T; \theta_T)\|p(c|x_i^S; \theta_S)] = \sum_{i=1}^{N}\sum_{c=1}^{D_C} p(c|x_i^T; \theta_T)\log\left[\frac{p(c|x_i^T; \theta_T)}{p(c|x_i^S; \theta_S)}\right]$$

i is the sample index, $\theta_T$ and are the parameters of the teacher and student networks, respectively, $p(c|x_i^T; \theta_T)$ and $p(c|x_i^S; \theta_S)$ are the posteriors of class c predicted by the teacher and student network given the input samples $x_i^T$ and $x_i^S$, respectively. To learn a student network that approximates the given teacher network, the KL divergence may be minimized with respect to the parameters of the student network while keeping the parameters of the teacher network fixed, equivalent to minimizing the loss function below as in equation 2:

$$\mathcal{L}_{TS}(\theta_S) = -\frac{1}{N}\sum_{i=1}^{N}\sum_{c=1}^{D_C} p(c|x_i^T; \theta_T)\log p(c|x_i^S; \theta_S)$$

However, in T/S learning, the knowledge from the teacher is not accurate when the teacher's classification decision is incorrect. To deal with this, an interpolated T/S method may use a weighted sum of the soft posteriors and the one-hot hard label to train the student model. Assuming that the sequence of one-hot ground truth class labels that both $X^T$ and $X^S$ are aligned with is $C = \{c_1, \ldots, c_N\}$, the interpolated T/S learning aims to minimizing the loss function as in equation 3:

$$\mathcal{L}_{ITS}(\theta_S) = -\frac{1}{N}\sum_{i=1}^{N}\sum_{c=1}^{D_C}[(1-\lambda)\mathbb{1}[c = c_i] + \lambda p(c|x_i^T; \theta_T)]\log p(c|x_i^S; \theta_S)$$

where $0 \leq \lambda \leq 1$ is the weight for the class posteriors and $\mathbb{1}[\cdot]$ is the indicator function which equals to 1 if the condition in the squared bracket is satisfied and 0 otherwise. Note that the interpolated T/S learning becomes soft T/S when $\lambda = 1.0$ and becomes standard cross-entropy training with hard labels when $\lambda = 0.0$. Although interpolated T/S compensates for the imperfection in knowledge transfer, the linear combination of soft and hard labels destroys the correct relationships among different classes embedded naturally in the soft class posteriors and deviates the student model parameters from the optimal direction. Moreover, the search for the best student model is subject to the heuristic tuning of λ between 0 and 1.

Figure 1B:
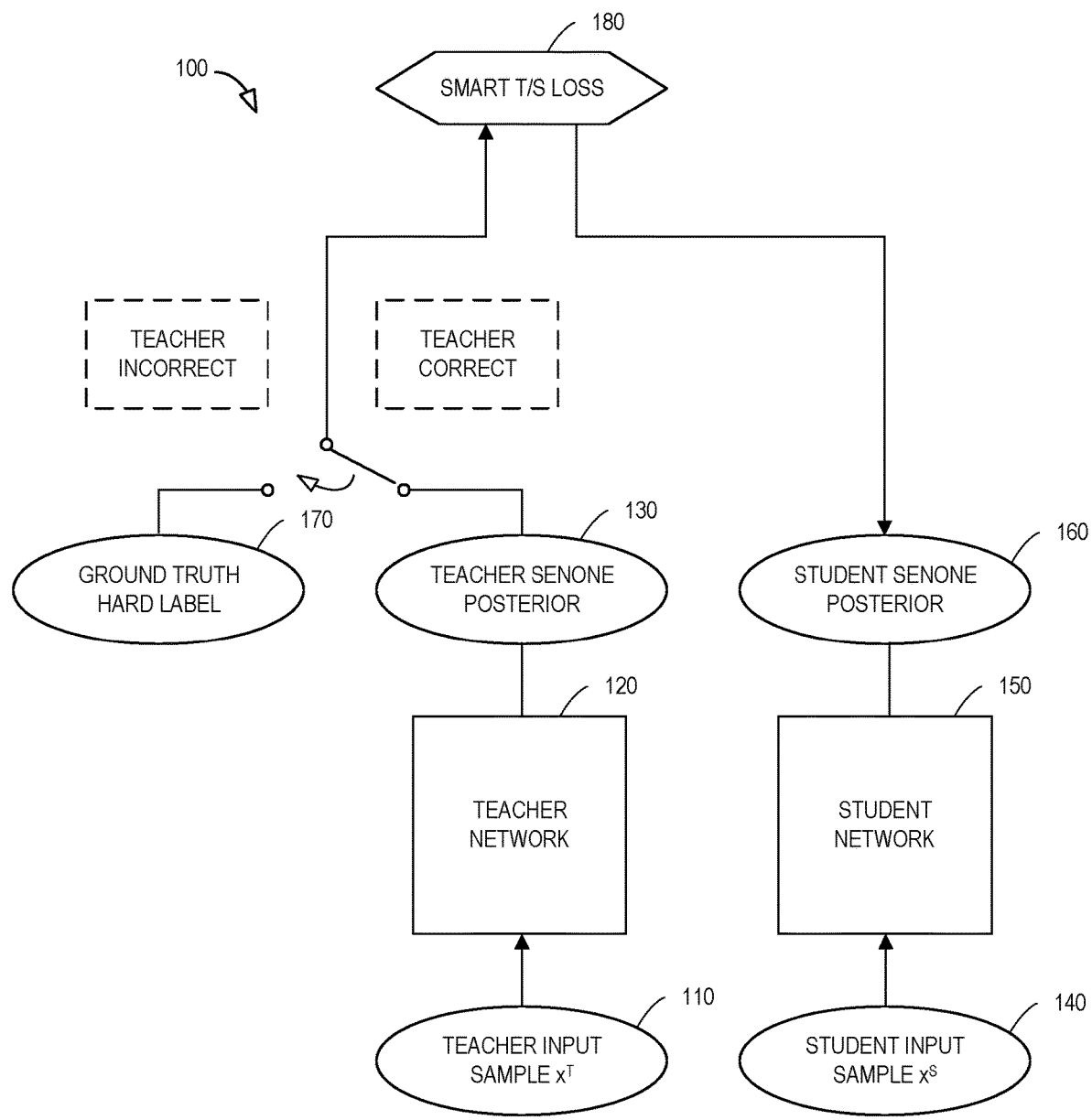
FIG. 1B is a framework conditional T/S learning in accordance with some embodiments.

Instead of blindly combining the soft and hard labels, the student network needs to be critical about the knowledge infused by the teacher network, i.e., to judge whether the class posteriors are accurate or not before learning from them. One natural judgment is that the teacher's knowledge is deemed accurate when it correctly predicts the ground truth given the input samples, and deemed inaccurate otherwise. Therefore, the training target for the student model should be conditioned on the correctness of the teacher's prediction, i.e., the student network exclusively uses the soft posteriors from the teach network as the training target when the teacher is correct and uses the hard label instead when the teacher is wrong as shown by the system 100 of FIG. 1B. The system 100 includes a teacher network 120 that receives a teacher input sample $x^T$ and generates a teacher senone posterior 130. Similarly, a student network 150 receives a student input sample $x^S$ 140 and generates a student senone posterior 160. A switch will route either a ground truth hard label 170 (when the teacher senone posterior 130 is wrong) or the teacher senone posterior 130 (when the teacher senone posterior 130 is correct) to a smart T/S loss element 180 to conditionally train the student network 150.

In other words, assuming $Y=\{y_1, \ldots, y_N\}$, $y_i \in \mathbb{R}^{D_C}$ to be the sequence of conditional class label vectors used as the target to train the student network, the $c^{th}$ element of $y_i$ becomes equation 4:

$$y_{i,c} = \begin{cases} p(c \mid x_i^T; \theta_T), & \operatorname{argmax}_{k \in \{1,\ldots,D_C\}} p(k \mid x_i^T; \theta_T) = c_i \\ \mathbb{1}[c = c_i], & \text{otherwise,} \end{cases}$$

under conditional T/S learning. That is to say, the conditional class label $y_i$ is a soft vector of class posteriors if the teacher is correct and a hard one-hot vector if the teacher is wrong. The loss function to be minimized is formulated as the cross-entropy between the conditional class labels and the class posteriors generated by the student network as in equation 5:

$$\mathcal{L}_{CTS}(\theta_S) = -\frac{1}{N}\sum_{i=1}^{N}\sum_{c=1}^{D_C} y_{i,c}\log p(c \mid x_i^S; \theta_S) =$$

$$-\frac{1}{N}\sum_{i=1}^{N}\left\{\left[\sum_{c=1}^{D_C} p(c \mid x_i^T, \theta_T)\log p(c \mid x_i^S; \theta_S)\right]\mathbb{1}\right.$$

$$\left[\operatorname{argmax}_{k \in \{1,\ldots,D_C\}} p(k \mid x_i^T; \theta_T) = c_i\right] +$$

$$\left.\log p(c_i \mid x_i^S; \theta_S)\mathbb{1}\left[\operatorname{argmax}_{k \in \{1,\ldots,D_C\}} p(k \mid x_i^T; \theta_T) \neq c_i\right]\right\}$$

The student network parameters are optimized through standard back propagation with stochastic gradient decent. With conditional T/S learning, the student can learn from only the selected accurate knowledge generated by the teacher while simultaneously take advantage of the well-preserved probabilistic relationships among different classes and is thus expected to achieve improved performance in classification tasks.

With the advent of deep acoustic models, the performance of ASR has been greatly improved. A deep acoustic model takes the speech frames as the input and predicts the corresponding senone posteriors at the output layer. To achieve robust ASR over different domains and speakers, embodiments may apply conditional T/S learning to the domain and speaker adaptation of deep acoustic models. In these tasks, both teacher and student networks represent deep acoustic models, $X^T$ and $X^S$ are sequences of input speech frames, and c denotes one senone in the set of all possible senones $\{1, \ldots, D_C\}$ predicted by the teacher and student acoustic models.

ASR may suffer from performance degradation when a well-trained acoustic model is applied in a new domain. T/S learning can effectively suppress this domain mismatch by adapting a source domain acoustic model to target-domain speech, in which a sequence of source-domain speech features is fed as the input to a source-domain teacher model and a parallel sequence of target domain features is at the input to the target-domain student model to optimize the student model parameters by minimizing the T/S loss in equation 2. The parallel data can be either recorded or simulated.

An example of T/S learning in a context of domain adaptation will now be provided for an Automatic Speech Recognition ("ASR") task where the goal is to learn a student acoustic model performing accurate ASR in the target domain. For this particular task, the inputs to the teacher and student models are source and target domain data, respectively. Note, however, that T/S learning can be applied to many other tasks other than ASR domain adaptation. For those tasks, both models are not necessarily ASR acoustic models and the inputs to both models are not necessarily from different domains. For example, in speaker adaptation and model compression tasks the inputs to both models might comprise the same data. In some embodiments, the teacher/student model could be an image classification model for image recognition. Moreover, T/S can be applied to domain adaptation, speaker adaptation, and model compression of any neural network models as well as Conditional T/S ("CT/S") learning. After describing a domain adaptation method in connection with FIG. 2A and a particular domain adaptation framework in FIGS. 2B and 2C, a speaker adaptation embodiment is described in connection with FIG. 3.

Figure 2A:
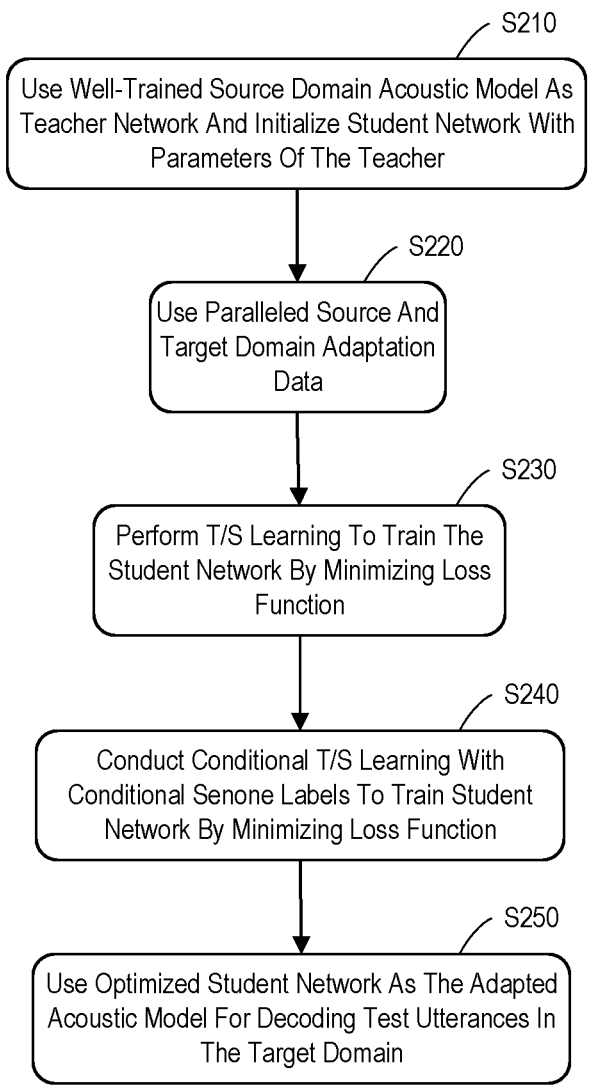
FIG. 2A is a domain adaptation method according to some embodiments.

FIG. 2A is a domain adaptation method according to some embodiments. To further improve T/S learning, some embodiments may introduce the conditional T/S learning by using the ground truth hard labels C of the adaptation data and propose the following steps for domain adaptation. At S210, the system may use a well-trained source-domain acoustic model as the teacher network and initialize the student network with the parameters of the teacher. At S220, paralleled source and target domain adaptation data may be used as $X^T$ and $X^S$, respectively. All pairs of $x_i^T$ and $x_i^S$, $\forall i \in \{1, \ldots, N\}$ are frame-by-frame synchronized. At S230, the system may perform T/S learning to train the student network by minimizing the loss function $\mathcal{L}_{TS}(\theta_S)$ in equation 2. After S230, the student network has performed reasonably well on target-domain data. As a result, the system may conduct conditional T/S learning with conditional senone labels Y defined in equation 4 to train the student network by minimizing the loss function $\mathcal{L}_{CTS}(\theta_S)$ in equation 5. The system may then use the optimized student network as the adapted acoustic model for decoding test utterances in the target domain.

Figure 2B:
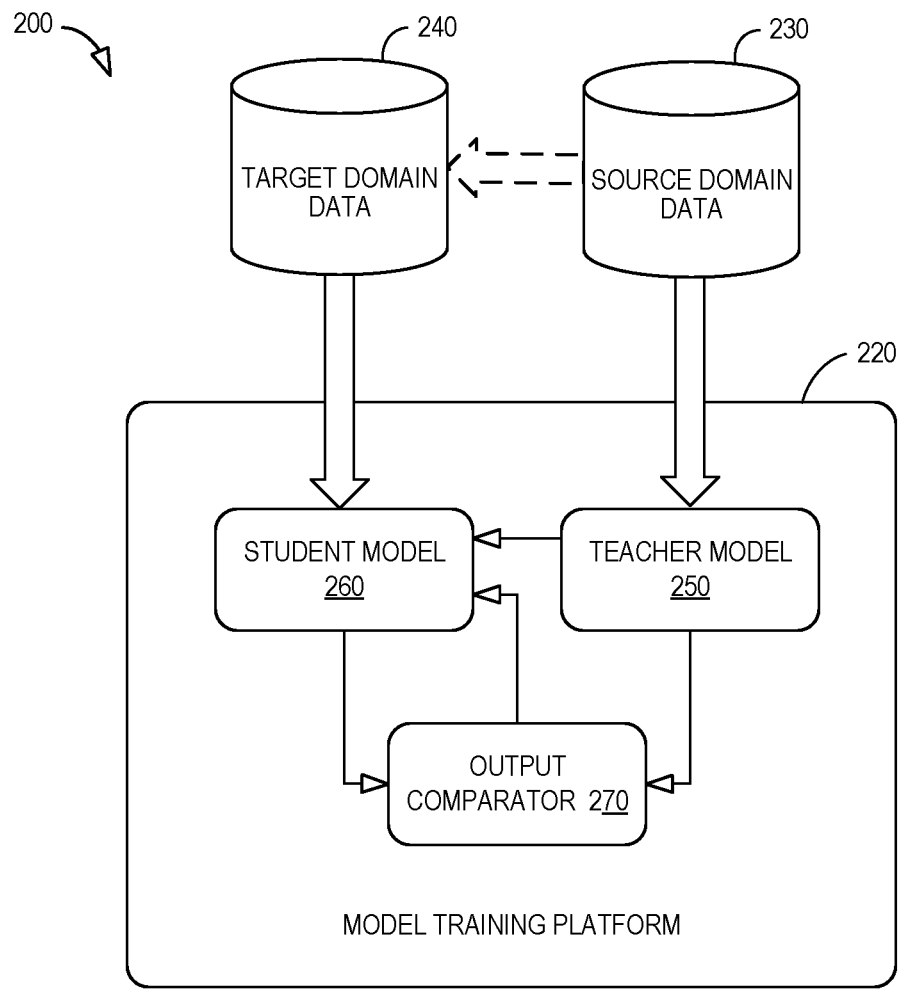
FIG. 2B is a high-level block diagram illustrating an example operating environment for domain adaptation according to some embodiments.
Figure 2B:
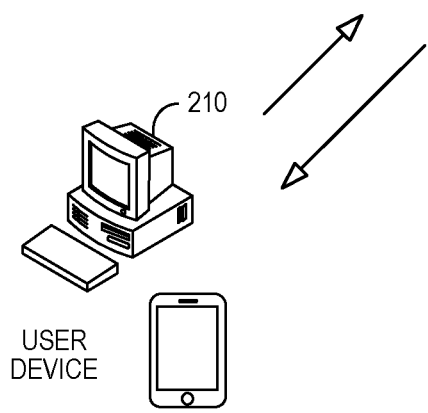

FIG. 2B illustrates an example operating environment 200 for domain adaptation in which the present disclosure may be practiced. Although FIG. 2B is described in connection with ASR domain adaptation, embodiments may be associated with any other type of neural network-based models. As illustrated, a user device 210 is in communication with a model training platform 220 to develop speech recognition models for use in particular domains. The model training platform 220 receives source domain data 230 and a target domain data 240 of various utterances from different domains that are fed in parallel to a teacher model 250 and a student model 260 respectively. The results from the speech recognition models 250, 260 are compared by an output comparator 270, and the differences between the two result sets are fed back to update the student model 260.

The user device 210 and model training platform 220 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 4 through 6.

In various aspects, the source domain data 230 are stored on the user device 210, within the model training platform 220, or in a database or other computing accessible by the model training platform 220. In some aspects, the target domain data 240 are part of a pre-existing dataset of a different domain than the source domain data 230 having parallel content. As used herein, a "domain" refers to a set of utterances having similar characteristics that a speech recognition model is trained to recognize words in. For example, a first domain may have a first Signal-to-Noise Ratio ("SNR") range and a second domain may have a second SNR range. In another example, a first domain will have a first mean voice frequency (e.g., utterances from adult males), a second domain will have a second mean voice frequency (e.g., utterances from adult females), and a third domain will have a third mean voice frequency (e.g., utterances from children). Other examples include a room impulse response, a speaker and recorder distance, a recording channel, etc. As will be appreciated, individual utterances may belong to several datasets (e.g., an utterance from an adult male having a first SNR range) and may be designated as such via various tags or labels in a database maintaining the datasets. In other aspects, such as when a dataset for a given domain does not exist, is of insufficient size, or is otherwise not accessible by the model training platform 220, the target domain data 240 may be created or supplemented from the source domain data 230 to simulate conformance with the characteristics that define the target domain.

The source domain data 230 are fed to the teacher model 250 and the target domain data 240 are fed to the student model 260 to train the student model 260 to evaluate utterances in the target domain accurately. At initiation, the teacher model 250 is fully trained for the source domain, and may be cloned (i.e., copied as a new instance) to create the initial student model 260.

In one aspect, the teacher model 250 is an acoustic model (e.g., associated with speech recognition) trained for a baseline domain and the student model 260 is a user-specific domain. The student model 260 may then be provided to the user device 210 for the user associated with that user-specific domain. For example, a user X who desires speech recognition on an associated user device 210 might contact the model training platform 220, select a baseline speech recognition model that has already been trained for a given language, dialect, or accent and provide utterances (the target domain data 240) to develop a student model 260 that is specific to user X's particular speech patterns from the baseline model (teacher model 250). The model developed may then be provided to the user device 210 or retained for later use as another teacher model 250. Similarly, the input utterances may be discarded or retained for later use in training.

In another aspect, the teacher model 250 is a speech recognition model trained for a given domain available for use by several user devices 210 and the student model 260 is a speech recognition model trained for a different domain that is also available for use by several user devices 210. For example, if a new voice compression codec is developed, a new speech recognition model may be trained for the dataset of utterances compressed by that codec (target domain data 240) so that user devices 210 that employ the new codec may accurately recognize words in utterances compressed thereby. User devices 210 may then download a selected student model 260 or have new student models 260 uploaded thereto.

The student model 260 is trained under the supervision of the teacher model 250, wherein each model 250, 260 receives utterances in their respective domains in parallel. Parallel utterances contain the same words but have different audio features. For example, a child saying a given word will generally use a higher mean vocal frequency than an adult saying the same word, due to adults generally having deeper voices than children. The parallel utterances are received by the respective teacher model 250 or student model 260, which may each correctly or incorrectly recognize the utterance as containing a given word (or a frame of the utterance containing a given phoneme or senone).

The outputs from the speech recognition models 250, 260 are compared by the output comparator 270, and the differences or similarities in recognition of the words/phonemes/senones in the utterance are fed back into the student model 260 to update the student model 260 according to one of various machine learning techniques or schemes to more accurately identify speech in accord with the outputs from the teacher model 250.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

In some embodiments, the training dataset inputs are provided from target domain data 240 to train the student model 260 during its learning phase, and the parallel source domain data 130 are analyzed by the teacher model 250. Note that some embodiments may treat T/S learning as a form of unsupervised learning because the soft posteriors generated by the teacher model are not real labels (e.g., ground truths) required by supervised learning.

Models may be run against a training dataset for several epochs, in which the training dataset is repeatedly fed into the model to refine its results. For example, in a supervised learning phase, a model is developed to predict the output for a given set of inputs and is evaluated over several epochs to more reliably provide the output that is specified as corresponding the given input for the greatest number of inputs for the training dataset. In another example, for an unsupervised learning phase, a model is developed to cluster the dataset into n groups and is evaluated over several epochs in how consistently it places a given input into a given group and how reliably it produces the n desired clusters across each epoch.

Once an epoch is run, the models are evaluated and the values of their variables are adjusted to attempt to better refine the model. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, etc.

The model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs (having reached a performance plateau) the learning phase for the given model may terminate before the epoch number/computing budget is reached.

Once the learning phase is complete, the models are finalized. Models that are finalized may be evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between clusterings is used to select a model that produces the clearest bounds for its clusters of data.

While the user device 210, model training platform 220, and data sources 230, 240 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 2B to route the communications between those systems, which are not illustrated so as to distract from the novel aspects of the present disclosure.

The speech recognition models 250, 260 receive utterances from the user device 210 and, during a training phase, from the domain data 230, 240 to identify the various phonemes and senones (including silences) present in the utterance, thus producing phonetic representations of the utterance at a frame level. In various aspects, a frame is a feature vector extracted from an audio signal within a predefined length of time, such as, for example, 5, 10, 15, or n milliseconds ("ms"). The recognized phonemes are used in various aspects to determine what the speaker is saying in an utterance, for example, to determine whether a key phrase is present, to identify the content of a command or query, etc.

In some aspects, the phonetic representations for the frames are produced from posterior features $\gamma_f$ for each frame f that provide statistical likelihoods that the frame f contains various phonemes/senones (e.g., tri-phone states). The posteriors are developed for the student model 260 during the training phase from initial weights that are supplied from the teacher model 250.

The student model 260 is a neural network (e.g., deep learning, deep convolutional, or recurrent neural networks), which comprises a series of "neurons," such as Long Short-Term Memory ("LSTM") nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

As discussed herein, for one to F frames in an utterance, the probabilities that a given frame f (where $f \in 1-F$) includes a given senone/phoneme are referred to as posterior distributions. The posterior distribution of the teacher model 250 is referred to as $P_T(s|x_T)$ and the posterior distribution of the student model 260 is referred to as $P_S(s|x_S)$ where $x_T$ and $x_S$ represent the parallel inputs from different domains to the teacher model 250 and student model 260 respectively and s represents the senones (or phonemes) that have been analyzed. Using the above definitions, a divergence score of a Kullback-Leibler ("KL") divergence between the two models (e.g., two models associated with speech recognition) determined by the output comparator 270 may be calculated. The KL divergence (also referred to as "relative entropy") is a measure of how one probability distribution is different from a second, reference probability distribution. In the simple case, a KL divergence of 0 indicates that the two distributions in question are identical.

Over successive epochs of training the student model 260, the weights applied to various inputs are adjusted to minimize the divergence score between the two models 250, 260. As will be appreciated, only the parameters of the student model 260 are adjusted during training. Accordingly, minimizing the KL divergence score is equivalent to minimizing (according to absolute value) the difference because the element of $P_T(s_i|x_{T,f}) \cdot \log(P_T(s_i|x_{T,f}))$ has no impact on optimization of the student model 260.

In the context of domain adaptation, note that the element $P_T(s_i|x_{T,f})$ provides a supervisory signal for training the student model 260 when the teacher model 250 and the student model 160 are provided parallel inputs $x_T$ and $x_S$ from their respective domains. As will be appreciated, because the inputs are provided in parallel, no labeling of the inputs is required (i.e., neither the source domain data 230 nor the target domain data 240 need to be labeled; both may be un-transcribed) and the training of the student model 260 may make use of an unlimited amount of training data. Because no labels are needed, for either of the domains when simulating the target domain data 240, huge amounts of parallel data can be generated from existing source domain data 230, which are used to make the behavior of the student model 260 for the target domain converge to that of the teacher model 250 for the source domain for which it was trained. Note that this might not be the case for conditional T/S learning.

In some aspects, the corpus of inputs for the target domain data 240 are generated from the corpus of inputs of the source domain data 230. Various signals may be overlaid to the source domain data 230 to produce a "noisy" target domain data 240, and volume changes, echo effects, compression schemes, etc. may also be applied to affect a different domain of utterances. Another transformation of the source domain data 230 into the target domain data 240 includes an adult/child domain swap. Obtaining a parallel corpus of adult and child utterances is challenging, due to privacy laws relating to gathering data from children versus adults, different rates of speech found in different individuals affecting utterance synchronization, etc., and therefore the source domain data 230 may be frequency warped to produce a training data set for the target domain data 240 that simulate childlike utterances. For example, a bilinear transform may be applied to warp adult speech spectrums to reconstruct the utterance with a higher pitch or average frequency of speech, where ω denotes the frequency and α denotes a warping factor. As will be appreciated, a static value for the warping factor α (e.g., 0.1) may be used, or vowel segments of known target domain data 240 may be calculated used to adjust the warping factor α based on the source domain data 230.

Figure 2C:
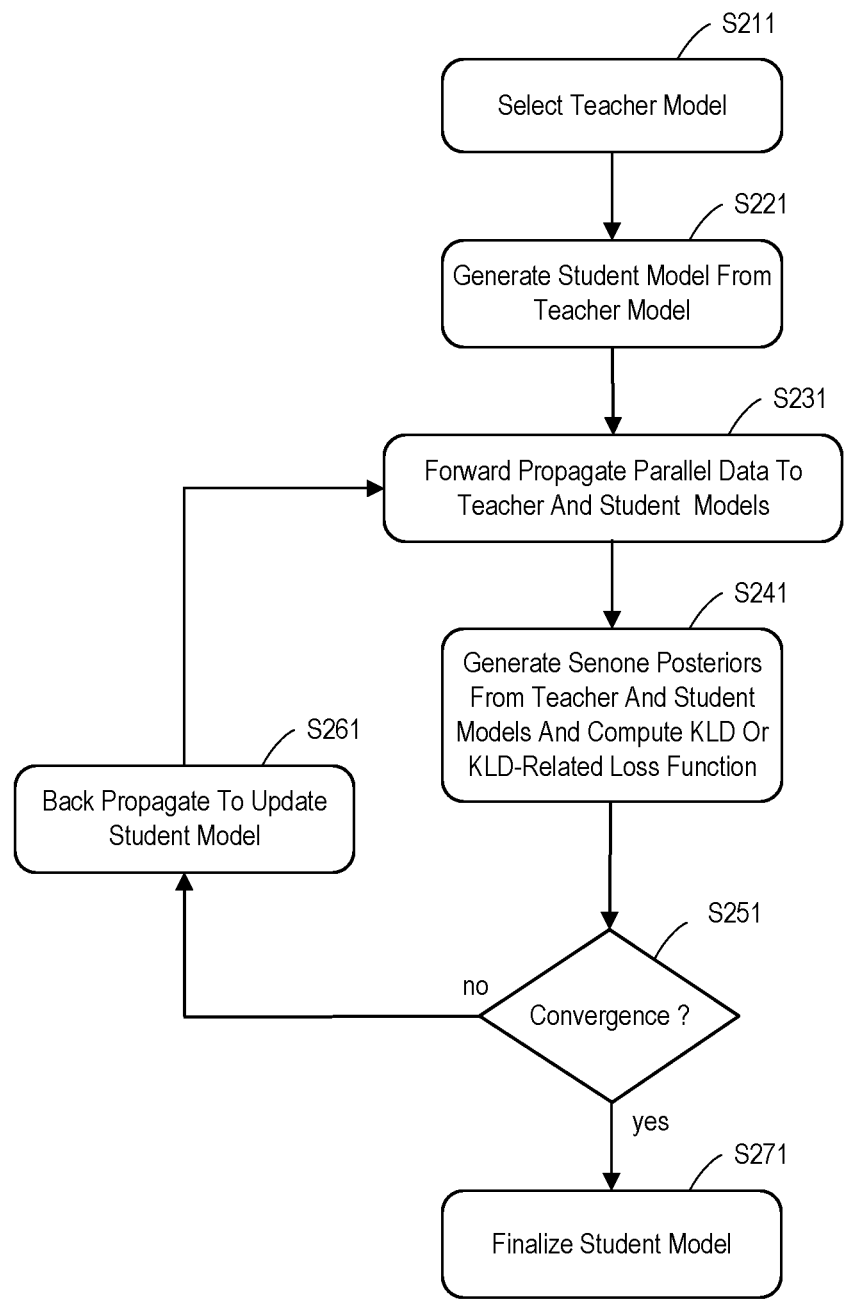
FIG. 2C is a flowchart showing general stages involved in T/S training for domain adaptation in accordance with some embodiments.

FIG. 2C is a flowchart showing general stages involved in an example method for student/teacher training for speech recognition. At S211, an already trained teacher model 250 associated with a dataset of source domain data 230 is selected. In various aspects, the teacher model 250 is selected based on a language, a dialect, an accent pattern, or the like. Proceeding to S221, an initial student model 260 is generated based on the teacher model 250. In various aspects, the initial student model 260 is a clone of the teacher model 250, wherein the neural networks are set exactly like those of the teacher model 250. As will be appreciated, during the course of method of FIG. 2C, neural networks of the student model 260 will be modified from their initial values or layouts to more accurately recognize speech in the domain for which the student model 260 is adapted by minimizing the divergence score calculated between the posteriors generated by the teacher model 250 and the student model 260.

The source domain data 230 and the target domain data 240 are forward propagated to the teacher model 250 and the student model 260, respectively, at S231. In some aspects, all of the target domain data 240 and associated source domain data 230 are forward propagated, while in other aspects a sub-set or batch of the target domain data 240 and associated source domain data 230 are forward propagated. In successive iterations of training the student model 260 the successive parallel batches will be fed to the teacher model 250 and the student model 260 to produce successive posteriors, which will be compared again against one another until a maximum number of epochs is reached, the divergence score satisfies a convergence threshold, divergence plateaus, or training is manually stopped.

The speech recognition models 250, 260 are fed the data in parallel from their associated domains to recognize sounds in the data as components of speech and/or as individual words. These components are calculated as posteriors at S241, in which the probabilities that a given frame of an utterance contains a given senone/phoneme are calculated, including probabilities that a given frame includes silences or otherwise lacks human speech. All of the probabilities for the potential senones/phonemes may then be output by the models.

Proceeding to S251, it is determined whether the behavior of the student model 260 converges with the behavior of the teacher model 250. In various aspects, the convergence is calculated as a KL divergence, as a modified KL divergence, or as another divergence score. When the divergence converges below a convergence threshold, it indicates that the student model 260 is able to recognize speech in its given domain almost as well as the teacher model 250 is able to recognize speech in its domain. When the divergence score does not satisfy the convergence threshold, it indicates that the student model 260 has not yet converged with the teacher model 250, and will require adjustment to its parameters. As will be appreciated, the student model 260 may be more or less accurate than the teacher model 250 in some cases for accurately recognizing speech, but is judged based on the similarity of its results to the results of the teacher model 250. As will also be appreciated, convergence may also occur when a maximum number of training rounds have occurred, a divergence plateau is reached, or when a user manually terminates training early.

In response to determining that the student model 260 has not converged relative to the teacher model 250, the method proceeds to S261. At S261, the errors (gradients) computed from the KLD-related loss function are back propagated to the student model 260 to update the parameters of the student model 260 in light of the divergent results. As will be appreciated, various machine learning techniques may be used to update the student model 260 in light of the results. Once the student model is updated, the method returns to S231 to feed the teacher model 250 and the updated student model 260 parallel data from their associated domains. As will be appreciated, subsequent executions of S231 may use the same or different (successive) data from the source domain data 230 and the target domain data 240.

In response to determining that the student model 260 has converged relative to the teacher model 250, the method proceeds to S271, where the student model 260 is finalized. Finalizing the student model 260 locks in the values (thresholds) and structures (e.g., node connections in a neural network) of the speech recognition model. Once finalized, the student model 260 may be transmitted to a user device 210 or third-party speech recognition service for speech recognition thereon, be used as a teacher model 250 for training a new student model 260, or undergo further testing or analysis. The method then concludes.

Speaker adaptation aims at learning a set of Speaker-Dependent ("SD") acoustic models by adapting a Speaker-Independent ("SI") acoustic model to the speech of target speakers. Different from domain adaptation, speaker adaptation has only access to limited adaptation data from target speakers and has no access to the source-domain data. Note that many techniques have been proposed for speaker adaptation of deep acoustic models, such as regularization-based, transformation-based, singular value decomposition-based and subspace-based approaches. Among these approaches, KL Divergence ("KLD") regularization is one of the most popular methods to prevent the adapted model from overfitting the limited speaker data. This regularization is realized by augmenting the training criterion with the KLD between the output distributions of the SD model and the SI model.

The KLD adaptation is a special case of the interpolated T/S learning, in which the SI model acts as a teacher, the SD model acts as a student, and both take the adaptation data as input. The teacher network is more like a regularizer that constrains the student network from straying too far away from the teacher network. As we have mentioned before, the linear combination between soft posteriors and hard labels does not make full use of two knowledge sources, and the best regularization weight is subject to heuristic tuning. We apply the conditional T/S learning to further improve the KLD adaptation. That is, when the SI model makes the right predictions, the SD model exclusively learns from the SI model; when the SI model is wrong, the adaptation target backs off to the hard labels.

Note that since the SD model grows from the SI model, the adaptation can be interpreted as a self-taught learning process. In the step of learning from the SI model, the SD model basically reviews what it has already known once again, which sounds not quite informative. However, if this step is removed, i.e., adapt the SD model only when the SI model makes a mistake, the performance degrades. This is because using partial training set leads to catastrophic forgetting and skews the estimation of the senone distributions for the target speaker towards those samples the teacher model makes mistakes on and there is no guarantee that the student model can work well on those samples the teacher model is good at.

Figure 3:
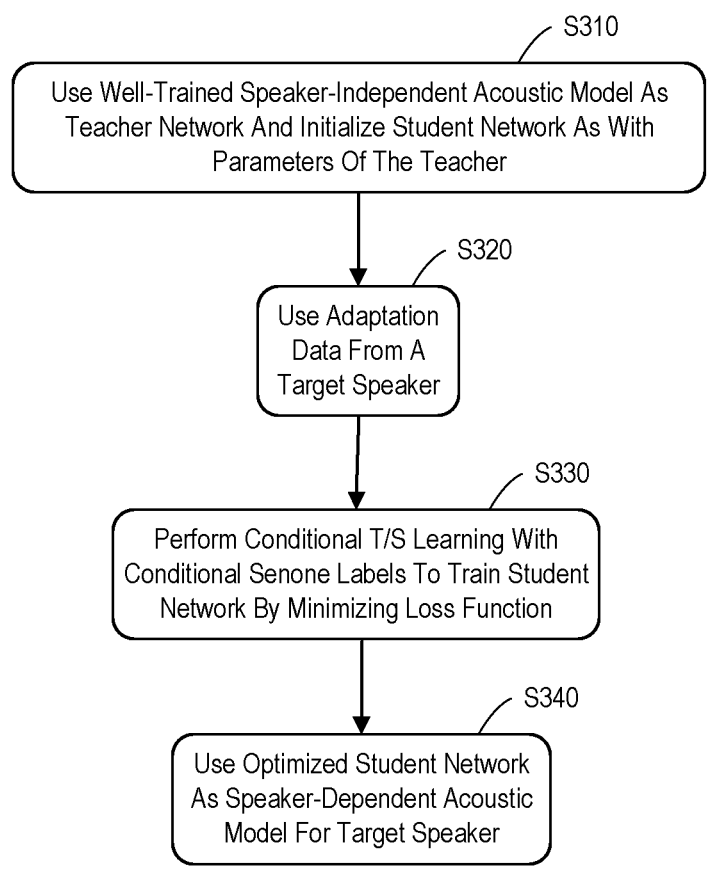
FIG. 3 is a speaker adaptation method in accordance with some embodiments.

The conditional T/S learning for speaker adaptation consists of the steps illustrated in FIG. 3. At S310, the system may use a well-trained SI acoustic model as the teacher network and initialize the student network with the parameters of the teacher. At S320, adaptation data from a target speaker may be used as both $X^T$ and $X^S$. At S330, the system may perform conditional T/S learning with conditional senone labels Y defined in equation 4 to train the student network by minimizing the loss function $\mathcal{L}_{CTS}(\theta_S)$ in equation 5. At S340, the optimized student network may be used as the SD acoustic model for this target speaker.

For unsupervised speaker adaptation, the SI model may be used to generate the hard labels C to judge the SI model itself. Since the recognition hypotheses are generated through the cooperation of the SI acoustic model along with the language model, the derived hard labels are expected to be more accurate than the senone classification decisions generated by only the SI model at the frame level.

While some implementations will be described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
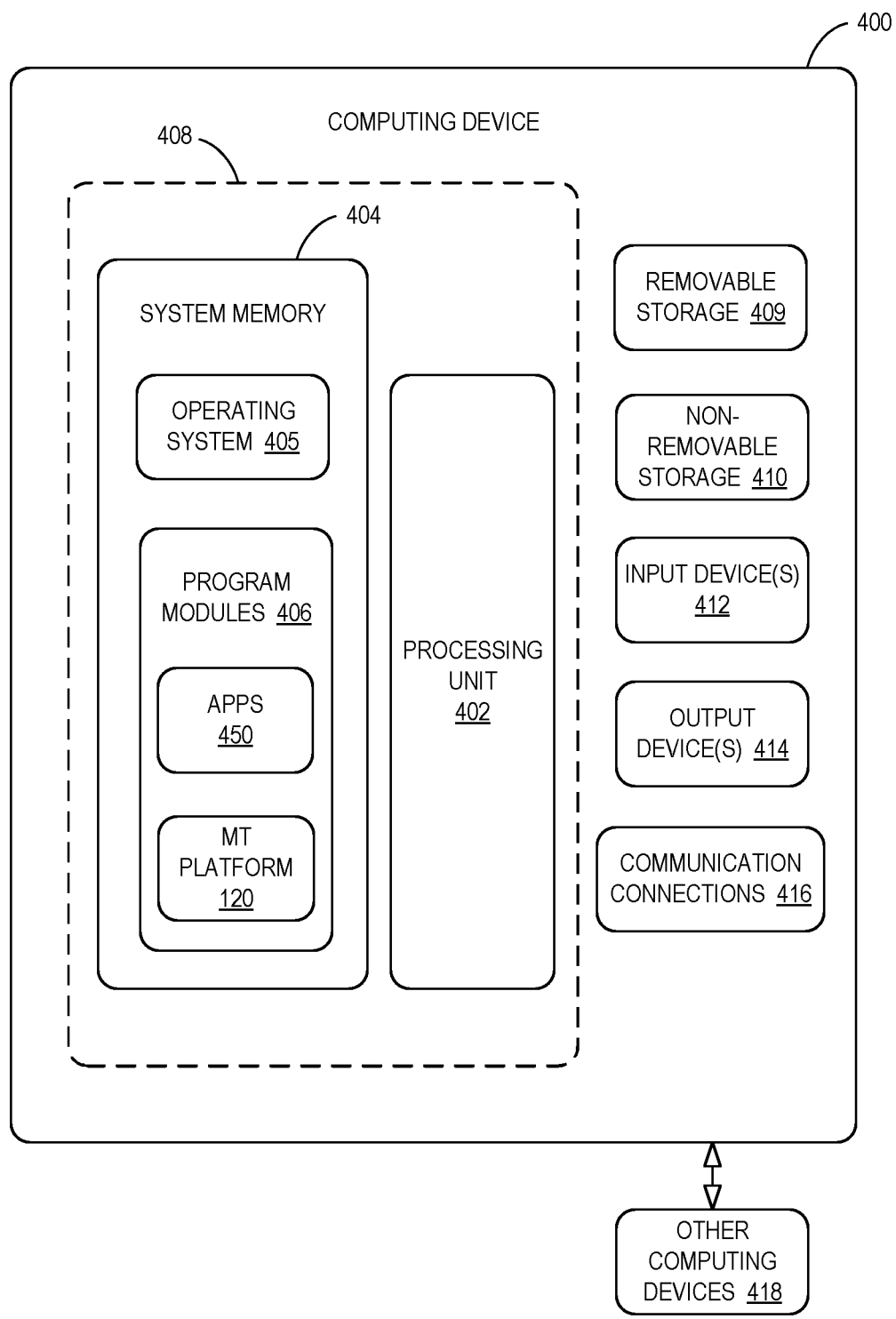
FIG. 4 is a block diagram illustrating example physical components of a computing device in accordance with some embodiments.
Figure 5A:
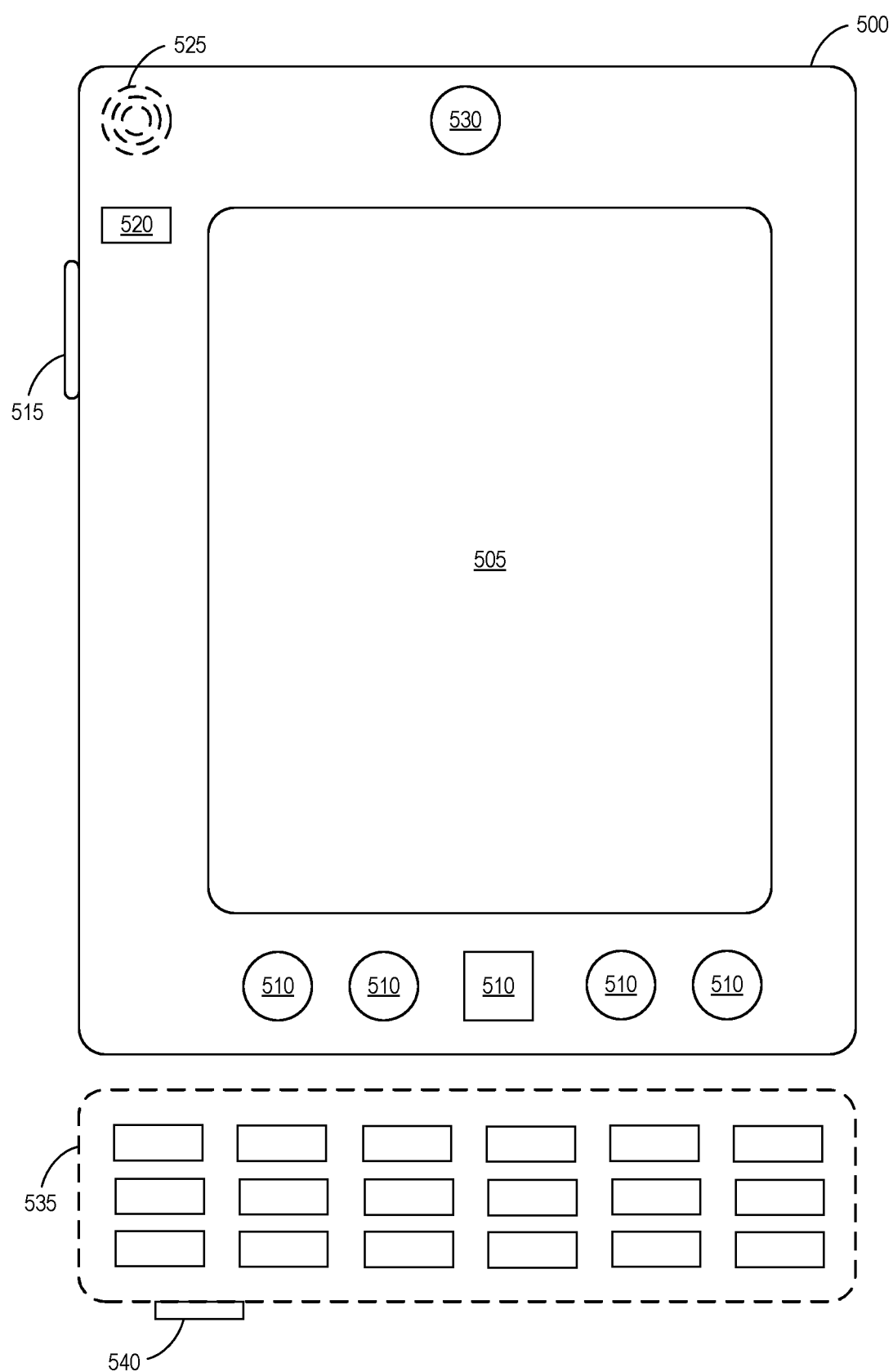
FIGS. 5A and 5B are block diagrams of a mobile computing device according to some embodiments.
Figure 5B:
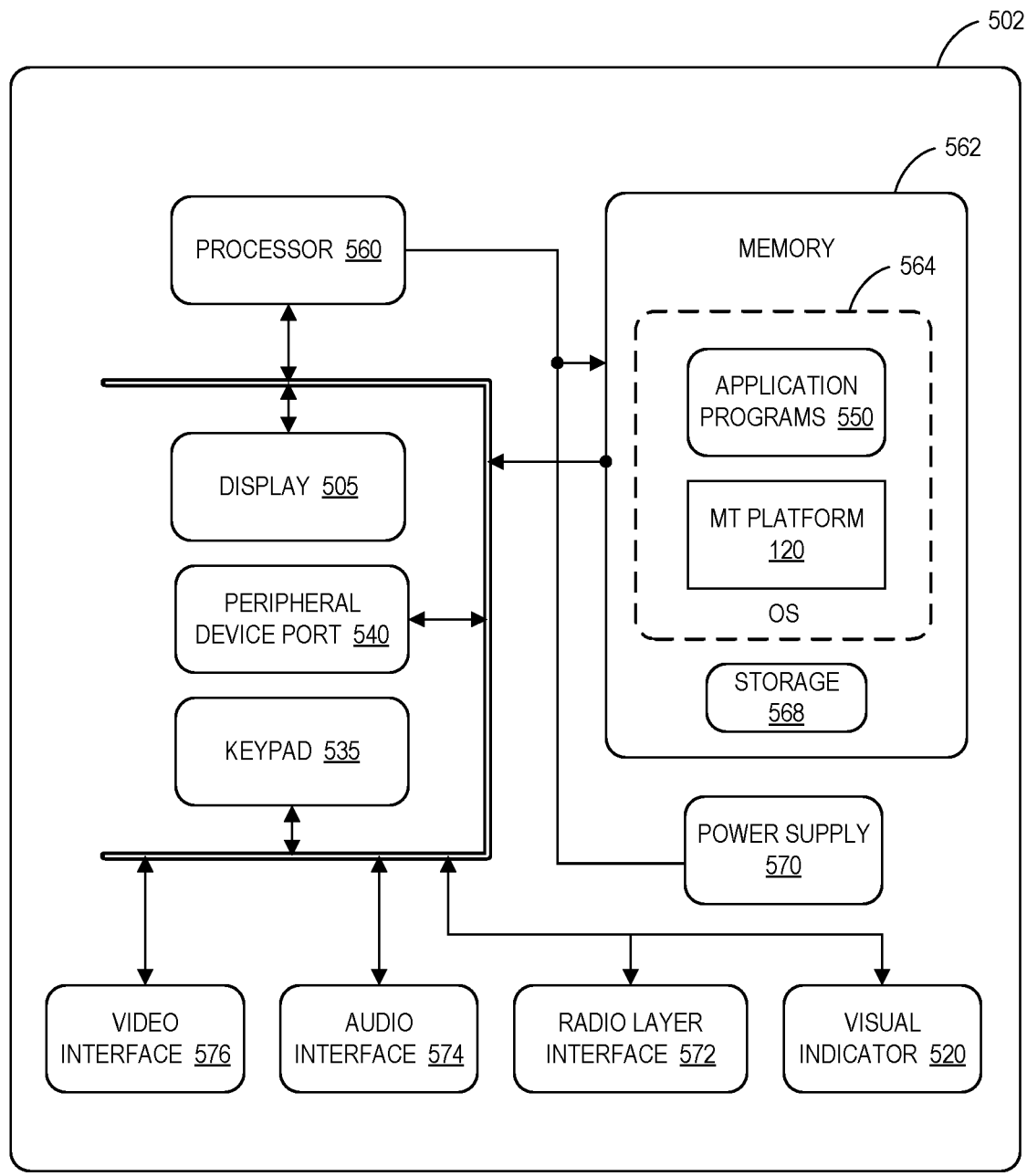
Figure 6:
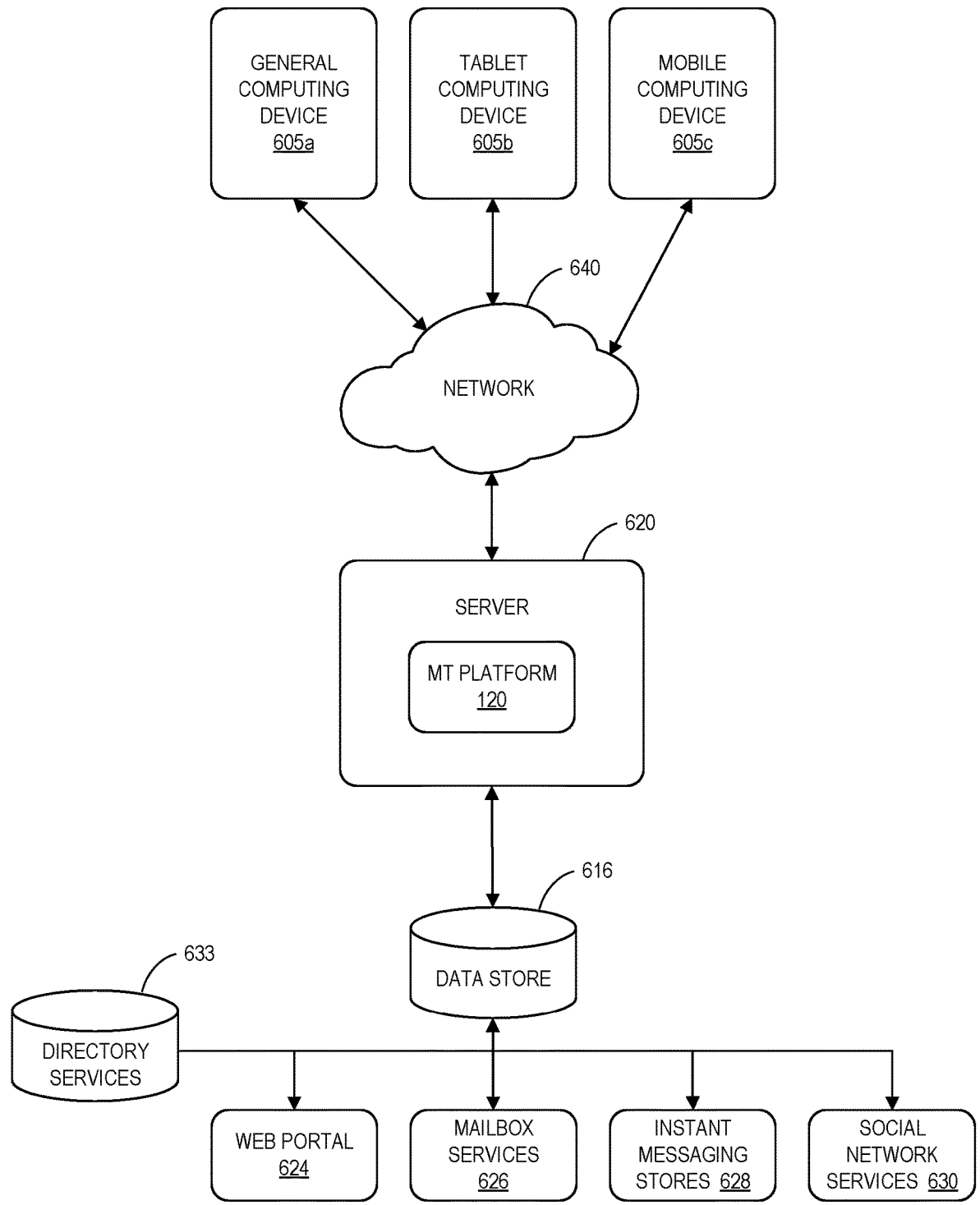
FIG. 6 is a block diagram of a distributed computing system in accordance with some embodiments

FIGS. 4 through 6 and the associated descriptions provide a discussion of a variety of operating environments in which examples are practiced. However, the devices and systems illustrated and discussed with respect to FIGS. 4 through 6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the Model Training ("MT") platform 120 in accordance with any of the embodiments described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., MT platform 120 in accordance with any of the embodiments described herein) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, Radio Frequency ("RF") transmitter, receiver, and/or transceiver circuitry; Universal Serial Bus ("USB"), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, Electrically Erasable Programmable Read-Only Memory ("EEPROM"), flash memory or other memory technology, CD-ROM, Digital Versatile Disks ("DVD") or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, RF, infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a Graphical User Interface ("GUI"), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., an HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., an HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated Personal Digital Assistant ("PDA") and wireless phone.

According to an aspect, one or more application programs 550 are loaded into the memory 562 and run on or in association with the operating system 564. Examples of the application programs include phone dialer programs, e-mail programs, Personal Information Management ("PIM") programs, word processing programs, spreadsheet programs, Internet browser programs, messaging programs, and so forth. According to an aspect, MT platform 120 in accordance with any of the embodiments described herein and/or one or more speech recognition models may be loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a Light Emitting Diode ("LED") and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic speech recognition as described above. Content developed, interacted with, or edited in association with the MT platform 120 in accordance with any of the embodiments described herein is enabled to be stored in different communication channels or other storage types. For example, various documents may be stored using a directory service 622, a web portal 624, a mailbox service 626, an instant messaging store 628, or a social networking site 630. The MT platform 120 in accordance with any of the embodiments described herein is operative to use any of these types of systems or the like for developing models with T/S learning. According to an aspect, a server 620 provides the MT platform 120 in accordance with any of the embodiments described herein to clients 605a, 605b, 605c. As one example, the server 620 is a web server providing the MT platform 120 in accordance with any of the embodiments described herein over the web. The server 620 provides the MT platform 120 in accordance with any of the embodiments described herein over the web to clients 605 through a network 640. By way of example, the client computing device is implemented and embodied in a personal computer 605a, a tablet computing device 605b, or a mobile computing device 605c (e.g., a smart phone), or other computing device. Any of these examples of the client computing device are operable to obtain content from the store 616.

Figure 7:
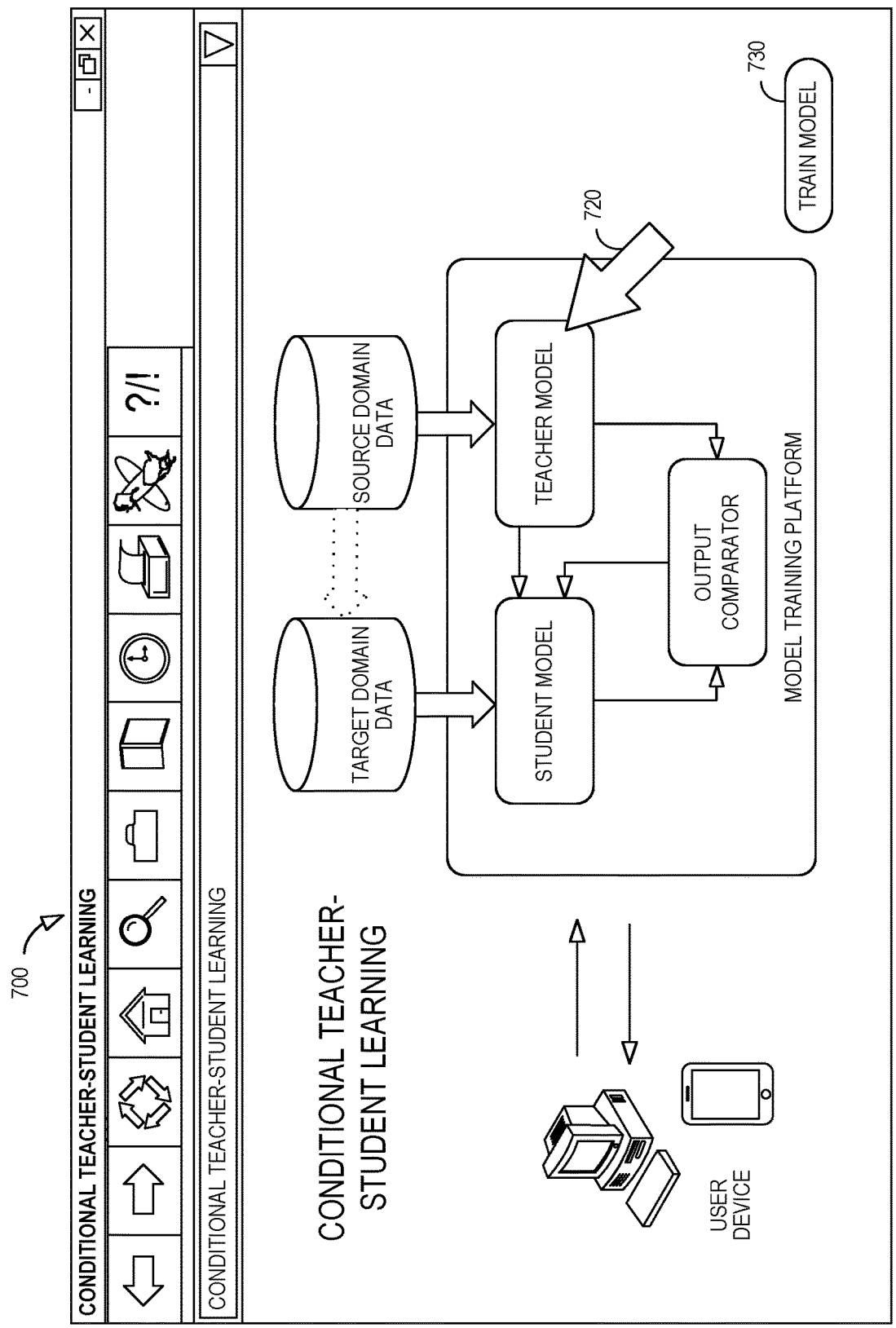
FIG. 7 is an operator or administrator display according to some embodiments.

An operator or administrator may view and/or adjust parameters associated with conditional T/S learning in accordance with any of the embodiments described herein. For example, FIG. 7 is conditional T/S model display 700 in accordance with some embodiments. The display 700 includes graphical elements 710 representing a conditional T/S learning system for recognizing CS utterances. Selection of various elements 710 (e.g., via a touchscreen or computer mouse pointer 720) may result in a display of additional details about that element 710 (e.g., via pop-up window) and/or provide the operator or administrator with a chance to alter or adjust properties of that element 710. For example, the operator or administrator might adjust teacher or student model parameters, update training sets, etc. According to some embodiments, selection of a "Train Model" icon 730 might result in updating various student model parameters.

Some implementations are described herein with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Thus, embodiments may provide systems and methods to accurately and efficiently improve T/S learning. As a major category of domain adaptation, conditional T/S learning with environment adaptation experiments was verified. Specifically, a well-trained clean acoustic model as adapted to the noisy training data of CHiME-3 using different methods. The CHiME-3 dataset incorporates Wall Street Journal ("WSJ") corpus sentences spoken in challenging noisy environments, recorded using a 6-channel tablet. The real far-field noisy speech from the 5th microphone channel in CHiME-3 development data set was used for testing. A standard WSJ 5K word 3-gram Language Model ("LM") was used for decoding.

Table 1 illustrates the ASR Word Error Rate ("WER") % performance of environment adaptation using one-hot hard label, T/S, interpolated T/S (IT/S) and conditional T/S learning on the real noisy test set of CHiME-3.

TABLE 1

| System | BUS | CAF | PED | STR | Average |
|---|---|---|---|---|---|
| Un-adapted | 43.47 | 45.93 | 30.43 | 36.13 | 38.96 |
| Hard label | 24.92 | 20.63 | 15.96 | 18.01 | 19.84 |
| Soft T/S | 22.46 | 19.10 | 14.88 | 16.47 | 18.20 |
| IT/S ($\lambda$ = 0.2) | 24.84 | 19.79 | 15.55 | 18.36 | 19.60 |
| IT/S ($\lambda$ = 0.5) | 22.61 | 18.94 | 14.52 | 18.43 | 18.59 |
| IT/S ($\lambda$ = 0.8) | 23.51 | 19.10 | 14.49 | 16.56 | 18.37 |
| Conditional T/S | 20.72 | 17.46 | 12.52 | 12.52 | 16.42 |

As a source-domain acoustic model, a clean LSTM Recurrent Neural Network ("RNN") was trained with 9,137 clean training utterances of CHiME-3 dataset by using cross-entropy criterion. The 29-dimensional log Mel filter-bank features together with 1st and 2nd order delta features (totally 87-dimensional) for both the clean and noisy utterances were extracted by following the process. The features were fed as the input of the LSTM after global mean and variance normalization. The LSTM had 4 hidden layers with 1,024 hidden units for each layer. A 512-dimensional projection layer was inserted on top each hidden layer to reduce the number of parameters. The output layer of the LSTM half 3,012 output units corresponding to 3,012 senone labels. There was no frame stacking, and the output HMM senone label was delayed by 5 frames. Senone-level forced alignment of the clean data was generated using a Gaussian mixture model-HMM system. The clean CHiME-3 LSTM acoustic model achieved 7.43% and 38.96% WERs on clean and real noisy test data of CHiME-3, respectively. The clean LSTM acoustic model served as the teacher network in the subsequent T/S learning methods. Trained with noisy and clean data using their one-hot hard labels, the multi-style LSTM acoustic model achieves 19.84% WER on the noisy test data.

For domain adaptation, parallel data consisting of 9,137 pairs of clean and noisy utterances in the CHiME-3 training set were used as the adaptation data for T/S learning. In order to make the student model invariant to environments, the training data for student model included both clean and noisy data. Therefore, the test extended the original T/S learning work by also including 9,137 pairs of the clean and clean utterances in CHiME-3 for adaptation. As shown in Table 1, soft T/S learning achieved 18.20% average WERs after environment adaptation, which is 51.3% relative improvement over the clean model. To further improve the student model, conditional T/S learning was performed with the help of hard labels as described herein. As a comparison, interpolated T/S learning was conducted with different weights for soft labels. The conditional T/S learning achieved 16.42% average WERs with 9.8% and 11.7% relative improvements over soft T/S learning and the best performed interpolated T/S ($\lambda$=0.5), respectively. Note that one can get a better student model if a better teacher model is available. Next, a quick experiment was performed by using a 375 hour-trained Cortana model which as the teacher model to learn the student model with the same CHiME-3 parallel data. The soft T/S model got a 13.56% WER which is significantly better the one in Table 1, and the conditional T/S could reach 11.13% WER, which stands for 17.9% relative improvement over soft T/S.

Speaker adaptation was performed on a Microsoft internal Phone Short Message Dictation ("SMD") task. The test set included 7 speakers with a total number of 20,203 words. A separate adaptation set of 200 sentences per speaker was used for model adaptation. An SI LSTM acoustic model was trained with 2,600 hours of Microsoft internal live US English data. This SI model had 4 hidden LSTM layers with 1,024 units in each layer and the output size of each LSTM layer was reduced to 512 by linear projection. The acoustic feature was an 80-dimensional log Mel filterbank. The output layer had a dimension of 5,980. The LSTM-RNN was trained to minimize the frame-level cross-entropy criterion. There was no frame stacking, and the output HMM state label was delayed by 5 frames. A trigram LM was used for decoding with around 8 M n-grams. This SI LSTM acoustic model achieved 13.95% WER on the SMD test set.

Table 2 illustrates the WER (%) performance of speaker adaptation using one-hot hard label, KLD and conditional T/S learning on Microsoft SMD task. The SI LSTM model was trained with 2,600 hours Microsoft Live US English data.

TABLE 2

| System | Supervised | Unsupervised |
|---|---|---|
| SI | | 13.95 |
| Hard Label | 13.20 | 13.77 |
| KLD ($\lambda$ = 0.2) | 12.61 | 13.65 |
| KLD ($\lambda$ = 0.5) | 12.54 | 13.55 |
| KLD ($\lambda$ = 0.8) | 13.17 | 13.72 |
| Conditional T/S | 12.17 | 13.21 |

Conditional T/S learning was performed to adapt the SI LSTM with 200 utterances in the adaptation set for each test speaker. For supervised adaptation, the hard labels came from the human transcription though forced alignment. For unsupervised adaptation, the SI model was used to generate the hypothesis. As a comparison, the standard adaptation with hard labels and KLD adaptation with regularization weights $\lambda$ of 0.2, 0.5, and 0.8 were also conducted to adapt the SI LSTM. Note that the adaptation with hard labels was equivalent to KLD adaptation with $\lambda$=0. As in Table 2, the KLD adaptation produces its best WERs of 12.54% and 13.55% for supervised and unsupervised adaptation at $\lambda$=0.5, respectively. The conditional T/S learning outperforms the KLD adaptation. It achieves 12.17% WER for supervised adaptation, which is 12.8% and 3.0% relative gain over the SI model and the best performed KLD adaptation ($\lambda$=0.5). For unsupervised adaptation, the conditional T/S learning achieved 13.21% WER, which is 5.3% and 2.5% relative gain over the SI acoustic model and KLD adaptation.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A system for conditional teacher-student model training, comprising:
   a computer processor; and
   a memory storage device including instructions that when executed by the computer processor enable the system to:
   access a trained teacher model configured to perform a task,
   create an untrained student model,
   provide training data labeled with ground truths to the trained teacher model to produce teacher posteriors representing the training data,
   determine which teacher posteriors match the ground truths,
   when it is determined that a teacher posterior matches an associated ground truth label, exclusively use the teacher posterior to train the untrained student model, and
   when it is determined that the teacher posterior does not match the associated ground truth label, use the associated ground truth label to train the untrained student model and refrain from using the teacher posterior that does not match the associated ground truth label.

2. The system of claim 1, wherein the trained teacher and untrained student models are associated with at least one of: (i) domain adaptation, (ii) speaker adaptation, and (iii) model compression.

3. The system of claim 2, wherein the trained teacher and untrained student models are further associated with at least one of; (i) a neural network model, and (ii) an acoustic model in an automatic speech recognition system.

4. The system of claim 1, wherein the task is associated with automatic speech recognition and the training data is associated with audio data containing utterances.

5. The system of claim 4, wherein the task is associated with automatic speech recognition domain adaptation of a neural network-based model.

6. The system of claim 5, wherein the trained teacher model is selected based on a selected language.

7. The system of claim 5, wherein the system is further operable to:
   produce target domain utterances by transforming source domain utterances according to at least one of: (i) a Signal-to-Noise Ratio range, (ii) a codec by which the utterances are encoded, (iii) a frequency band for the utterances, (iv) a volume level, (v) an average speech frequency for the utterances, (vi) a room impulse response, (vii) a speaker and recorder distance, and (viii) a recoding channel.

8. The system of claim 4, wherein the task is associated with automatic speech recognition speaker adaptation of a neural network-based model.

9. The system of claim 1, wherein the instructions further enable the system to:
   determine whether student posteriors converge with the teacher posteriors,
   in response to determining that the student posteriors and the teacher posteriors converge, finalize the untrained student model, and
   in response to determining that the student posteriors and the teacher posteriors do not converge, conditionally update parameters of the untrained student model.

10. The system of claim 9, wherein parameters of the untrained student model are updated according to a back propagation of the student posteriors.

11. A computer implemented method for model training, comprising:
    accessing a trained teacher model configured to perform a task;
    creating an untrained student model;
    providing training data labeled with ground truths to the trained teacher model to produce teacher posteriors representing the training data;
    determining which teacher posteriors match the ground truths;
    when it is determined that a teacher posterior matches an associated ground truth label, automatically and exclusively using, by a model training platform, the teacher posterior to train the untrained student model; and
    when it is determined that the teacher posterior does not match the associated ground truth label, automatically using, by the model training platform, the ground truth label to train the untrained student model while refraining from using the teacher posterior that does not match the associated ground truth label to train the student model.

12. The method of claim 11, wherein the task is associated with automatic speech recognition and the training data is associated with audio data containing utterances.

13. The method of claim 12, wherein the task is associated with automatic speech recognition domain adaptation of a neural network-based model.

14. The method of claim 12, wherein the task is associated with automatic speech recognition speaker adaptation of a neural network-based model.

15. The method of claim 11, further comprising:
    determining whether student posteriors converge with the teacher posteriors;
    in response to determining that the student posteriors and the teacher posteriors converge, finalize the trained teacher model; and
    in response to determining that the student posteriors and the teacher posteriors do not converge, conditionally update parameters of the untrained student model.

16. The method of claim 15, wherein parameters of the untrained student model are updated according to a back propagation of the student posteriors.

17. A hardware storage device storing instructions to be executed by a processor to perform a method for automatic speech recognition, the method comprising:
    accessing a trained teacher model configured to perform a task;
    creating an untrained student model;

providing training data labeled with ground truths to the trained teacher model to produce teacher posteriors representing the training data;

when it is determined that a teacher posterior matches the associated ground truth label, using the teacher posterior to train the untrained student model; and when it is determined that the teacher posterior does not match the associated ground truth label, use the associated ground truth label to train the untrained student model and refrain from using the teacher posterior that does not match the associated ground truth label.

18. The hardware storage device of claim 17, wherein the task is associated with automatic speech recognition and the training data is associated with audio data containing utterances.

19. The hardware storage device of claim 18, wherein the task is associated with automatic speech recognition domain adaptation of a neural network-based model.

20. The hardware storage device of claim 19, wherein the trained teacher model is selected based on a selected language.

21. The hardware storage device of claim 19, wherein the method further comprises:

producing target domain utterances by transforming source domain utterances according to at least one of: (i) a Signal-to-Noise Ratio range, (ii) a codec by which the utterances are encoded, (iii) a frequency band for the utterances, (iv) a volume level, (v) an average speech frequency for the utterances, (vi) a room impulse response, (vii) a speaker and recorder distance, and (viii) a recoding channel.

22. The hardware storage device of claim 18, wherein the task is associated with at least one of: (i) automatic speech recognition speaker adaptation of a neural network based model, (ii) device personalization providing limited data from a target speaker, (iii) noise speech recognition using clean/noisy speech pair data, (iv) far field speech recognition using close-talk/far-talk speech pair data, (v) kids speech recognition using adults/kids speech pair data, (vi) narrow-band speech recognition using wide-band/narrow-band speech pair data, and (vii) audio-codec speech recognition using original/codec speech pair data.

* * * * *